(12) United States Patent
So et al.

(10) Patent No.: US 8,908,139 B2
(45) Date of Patent: Dec. 9, 2014

(54) LIQUID CRYSTAL DISPLAY APPARATUS

(75) Inventors: Dong-Yoon So, Yongin (KR); Yong-Je Jeon, Yongin (KR); Sun-Kyo Jung, Yongin (KR)

(73) Assignee: Samsung Display Co., Ltd. (KR)

( * ) Notice: Subject to any disclaimer, the term of this patent is extended or adjusted under 35 U.S.C. 154(b) by 231 days.

(21) Appl. No.: 13/077,436

(22) Filed: Mar. 31, 2011

(65) Prior Publication Data

US 2011/0317109 A1 Dec. 29, 2011

(30) Foreign Application Priority Data

Jun. 24, 2010 (KR) ........................ 10-2010-0060131

(51) Int. Cl.
*G02F 1/1339* (2006.01)
*G02F 1/1335* (2006.01)

(52) U.S. Cl.
CPC ................................. *G02F 1/13394* (2013.01)
USPC ............ 349/155; 349/106; 349/107; 349/114

(58) Field of Classification Search
CPC ..................... G02F 1/133514; G02F 1/133371
USPC ........................... 349/106–109, 114, 155–157
See application file for complete search history.

(56) References Cited

U.S. PATENT DOCUMENTS

| | | | | |
|---|---|---|---|---|
| 2005/0122450 | A1* | 6/2005 | Kang | 349/114 |
| 2006/0028598 | A1* | 2/2006 | Lee et al. | 349/107 |
| 2006/0103785 | A1* | 5/2006 | Yamada et al. | 349/107 |

FOREIGN PATENT DOCUMENTS

| | | |
|---|---|---|
| KR | 1020040011678 A | 2/2004 |
| KR | 1020050045660 A | 5/2005 |
| KR | 1020080062822 A | 7/2008 |

\* cited by examiner

*Primary Examiner* — Jessica M Merlin
(74) *Attorney, Agent, or Firm* — Knobbe Martens Olson & Bear LLP

(57) ABSTRACT

A liquid crystal display apparatus is disclosed. The liquid crystal display apparatus includes: a plurality of sub-pixels, a first substrate on which at least one first thin film is disposed, a second substrate facing the first substrate and on which at least one second thin film is disposed, a liquid crystal layer disposed between the first substrate and the second substrate, and a spacer unit disposed between the first substrate and the second substrate to maintain a space where the liquid crystal layer is disposed, and continuously formed across at least two sub-pixels from among the plurality of sub-pixels, where the spacer unit includes a contact unit and an isolation unit including a plurality isolation sub-units, where the contact unit is formed to contact the first thin film closest to the liquid crystal layer and the second thin film closest to the liquid crystal layer, where the isolation unit is formed to be spaced apart from the first thin film closest to the liquid crystal layer and to contact the second thin film closest to the liquid crystal layer, and where a distance between the plurality of isolation sub-units and the first thin film closest to the liquid crystal layer is not uniform.

3 Claims, 12 Drawing Sheets

LIQUID CRYSTAL DISPLAY APPARATUS

CROSS-REFERENCE TO RELATED APPLICATIONS

This application claims the benefit of Korean Patent Application No. 10-2010-0060131, filed on Jun. 24, 2010, in the Korean Intellectual Property Office, the disclosure of which is incorporated herein in its entirety by reference.

BACKGROUND

1. Field

The present disclosure relates to a liquid crystal display apparatus, and more particularly, to a liquid crystal display apparatus having improved image quality.

2. Description of the Related Technology

Display apparatuses have been recently replaced with portable flat panel display apparatuses. Liquid crystal display apparatuses, among the portable flat panel display apparatuses, have recently been highlighted due to relatively low power consumption and relatively low generation of electromagnetic waves.

A liquid crystal display apparatus typically includes a liquid crystal layer disposed in a space between two substrates. The space is called a cell gap, and significantly affects driving of the liquid crystal layer and image quality of the liquid crystal display apparatus.

It is generally difficult to control mobility of a liquid crystal layer while maintaining such a cell gap, and thus improvement of image quality of liquid crystal display apparatuses is generally limited.

SUMMARY OF CERTAIN INVENTIVE ASPECTS

A liquid crystal display apparatus including: a plurality of sub-pixels, a first substrate on which at least one first thin film is disposed, a second substrate facing the first substrate and on which at least one second thin film is disposed, a liquid crystal layer disposed between the first substrate and the second substrate, and a spacer unit disposed between the first substrate and the second substrate to maintain a space where the liquid crystal layer is disposed, and continuously formed across at least two sub-pixels from among the plurality of sub-pixels, where the spacer unit includes a contact unit and an isolation unit including a plurality isolation sub-units, where the contact unit is formed to contact the first thin film closest to the liquid crystal layer and the second thin film closest to the liquid crystal layer, where the isolation unit is formed to be spaced apart from the first thin film closest to the liquid crystal layer and to contact the second thin film closest to the liquid crystal layer, and where a distance between the plurality of isolation sub-units and the first thin film closest to the liquid crystal layer is not uniform.

BRIEF DESCRIPTION OF THE DRAWINGS

The above and other features and advantages will become more apparent by describing in detail certain embodiments with reference to the attached drawings in which.

DETAILED DESCRIPTION OF CERTAIN INVENTIVE EMBODIMENTS

Hereinafter, certain embodiments will be described more fully with reference to the accompanying drawings.

Figure 1:
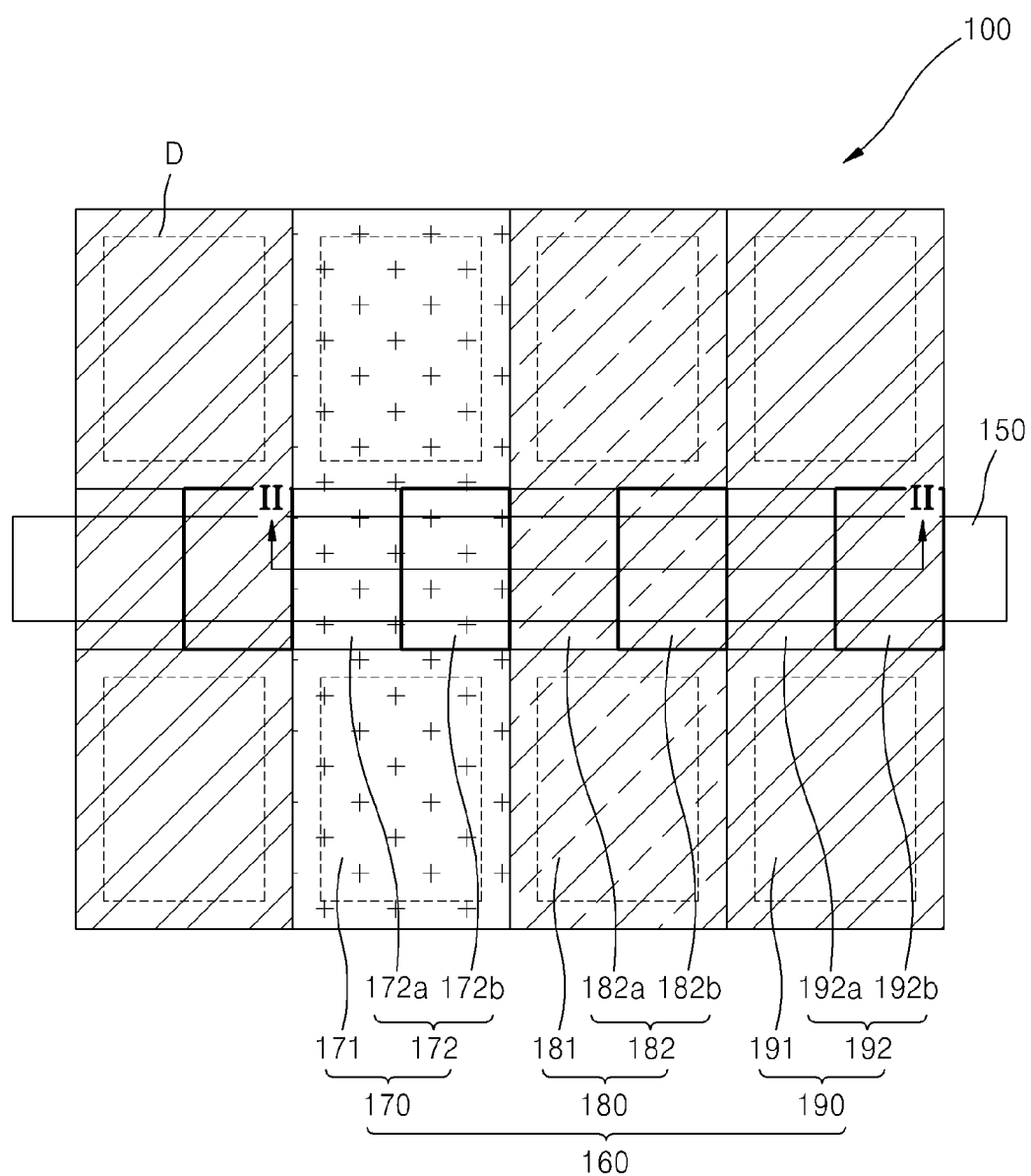
FIG. 1 is a plan view of an embodiment of a liquid crystal display apparatus.
Figure 2:
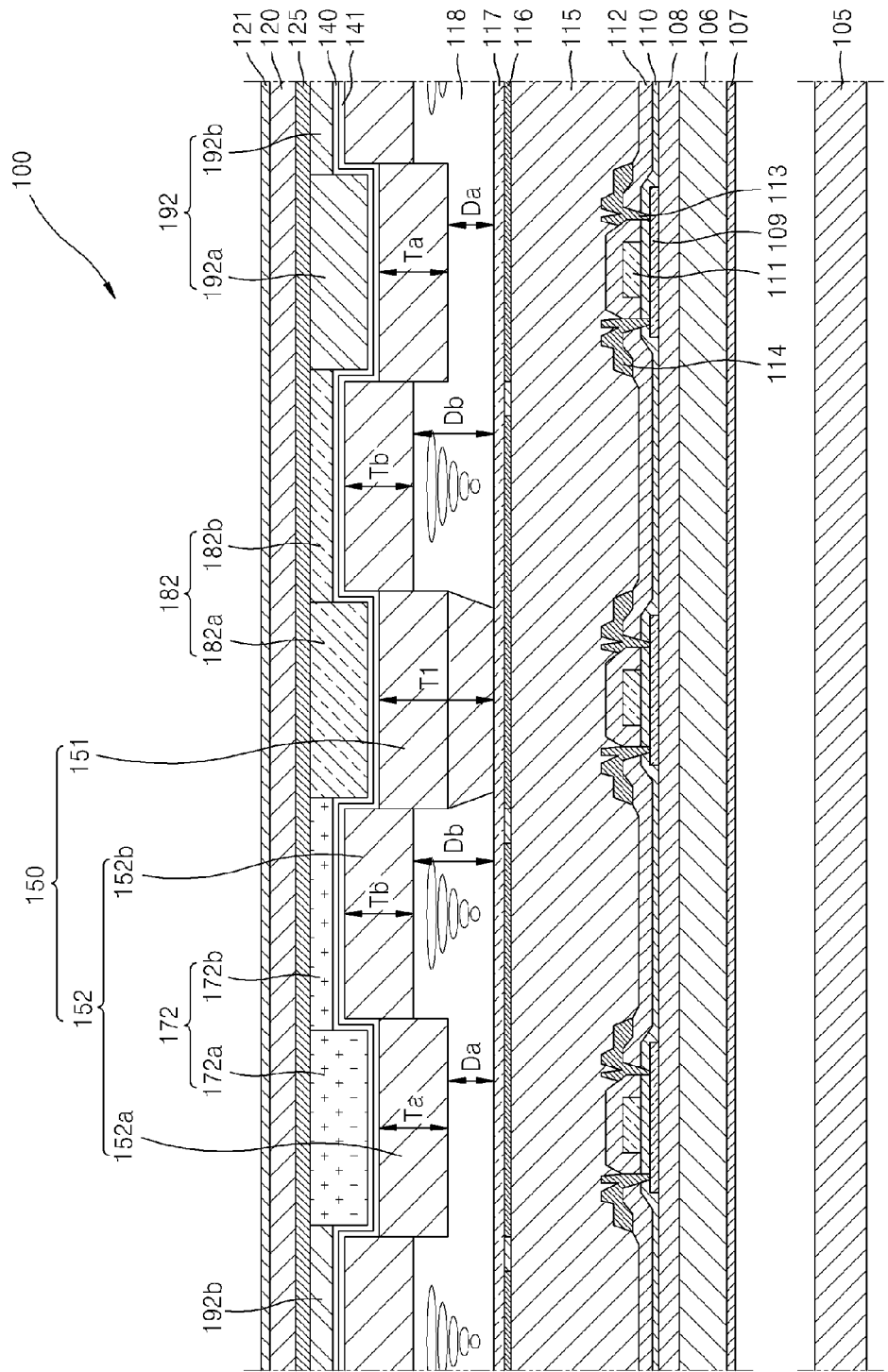
FIG. 2 is a cross-sectional view taken along line II-II of FIG. 1.

FIG. 1 is a plan view of an embodiment of a liquid crystal display apparatus 100, and FIG. 2 is a cross-sectional view taken along line II-II of FIG. 1.

Referring to FIGS. 1 and 2, the liquid crystal display apparatus 100 includes a first substrate 106, a second substrate 120, a liquid crystal layer 118, and a spacer unit 150.

The first substrate 106 is disposed above a backlight 105. The backlight 105 includes various types of optical sources and emits light toward the liquid crystal layer 118. The first substrate 106 is formed of a transparent substrate. The first substrate 106 can include a transparent glass material, such as $SiO_2$, or a transparent plastic material.

A first polarization layer 107 is formed on the surface of the first substrate 106 facing the backlight 105. A buffer layer 108 is formed on the upper surface of the first substrate 106, which is opposite to the surface facing the backlight 105. The buffer layer 108 provides a smooth surface and prevents impurities from flowing into the first substrate 106. The buffer layer 108 may be formed of $SiO_2$ and/or $SiN_x$.

A plurality of active layers 109, each having a predetermined pattern, is formed on portions of the buffer layer 108. A gate insulating layer 110 is formed on the active layers 109, and a plurality of gate electrodes 111, each having a predetermined pattern, is formed on the gate insulating layer 110. An interlayer insulating layer 112 is formed on the gate electrodes 111 to cover the gate electrodes 111. The gate insulating layer 110 and the interlayer insulating layer 112 are etched to expose predetermined areas of the active layers 109. A plurality of source electrodes 113 and a plurality of drain electrodes 114 are respectively formed to be electrically connected to the exposed areas of the active layers 109.

A passivation layer 115 is formed to cover the source electrodes 113 and the drain electrodes 114. A first electrode 116 having a predetermined pattern is formed on the passivation layer 115. Although not illustrated in FIG. 2, the first electrode 116 is formed to be electrically connected to the source electrodes 113 or the drain electrodes 114.

The second substrate 120 is disposed facing the first substrate 106. Similar to the first substrate 106, the second substrate 120 is formed of a transparent material. The liquid crystal layer 118 is disposed between the first substrate 106 and the second substrate 120. A black matrix layer 125 having a predetermined pattern is formed on the lower surface of the second substrate 120, and a color filter unit 160 is formed on the lower surface of the black matrix layer 125.

A second electrode 140 is formed on the lower surface of the color filter unit 160. A first alignment layer 117 and a second alignment layer 141, which help orient the liquid crystal layer 118, are respectively formed on surfaces of the first electrode 116 and the second electrode 140 facing each other.

A second polarization layer 121 is formed on the upper surface of the second substrate 120 facing the outside. A protection layer (not illustrated) may be formed on the second polarization layer 121 in order to prevent breakage due to a force applied from the outside.

The spacer unit 150 is formed in the space between the first substrate 106 and the second substrate 120 where the liquid crystal layer 118 is disposed. The spacer unit 150 includes a contact unit 151 and an isolation unit 152.

The contact unit 151 contacts both the uppermost surface formed on the first substrate 106, the first alignment layer 117, and the lowermost surface formed on the second substrate 120, the second alignment layer 141. The isolation unit 152 is spaced apart from the first alignment layer 117 and contacts only the second alignment layer 141.

Referring to FIG. 1, in some embodiments, the color filter unit 160 includes a first color filter 170, a second color filter 180, and a third color filter 190. The first color filter 170 has a first color, the second color filter 180 has a second color, and the third color filter 190 has a third color.

The liquid crystal display apparatus 100 includes a plurality of sub-pixels. The first color filter 170, the second color filter 180, and the third color filter 190 are formed to each correspond to a subset of sub-pixels among the plurality of sub-pixels. The first color filter 170 corresponds to the sub-pixels that realize the first color, the second color filter 180 corresponds to the sub-pixels that realize the second color, and the third color filter 190 corresponds to the sub-pixels that realize the third color.

The black matrix layer 125 is formed between the second substrate 120 and the color filter unit 160 in order to prevent colors from being mixed, and to improve contrast. Visible rays are not realized in the area covered by the black matrix layer 125. In FIG. 1, area D illustrated represents an area where visible rays are realized, where the black matrix layer 125 is not disposed.

The first color filter 170 includes a plurality of first area units 171, and a first connecting unit 172. The first connecting unit 172 is formed to connect two adjacent first area units 171 among the plurality of first area units 171 to each other, and includes a connecting unit 172a and a connecting unit 172b. The connecting unit 172b has a smaller thickness than that of the connecting unit 172a.

The second color filter 180 includes a plurality of second area units 181, and a second connecting unit 182. The second connecting unit 182 is formed to connect two adjacent second area units 181 among the plurality of second area units 181 to each other, and includes a connecting unit 182a and a connecting unit 182b. The connecting unit 182b has a smaller thickness than that of the connecting unit 182a.

The third color filter 190 includes a plurality of third area units 191, and a third connecting unit 192. The third connecting unit 192 is formed to connect two adjacent third area units 191 among the plurality of third area units 191 to each other, and includes a connecting unit 192a and a connecting unit 192b. The connecting unit 192b has a smaller thickness than that of the connecting unit 192a.

In the embodiment of FIG. 1, the first area unit 171, the second area unit 181, and the third area unit 191 are arranged to each correspond to the area D.

Referring again to FIG. 2, the contact unit 151 of the spacer unit 150 is formed to correspond to the connecting unit 182a of the second color filter 180.

The isolation unit 152 of the spacer unit 150 includes a plurality of isolation sub-units. More specifically, the plurality of isolation sub-units includes first isolation sub-units 152a and second isolation sub-units 152b.

The first isolation sub-units 152a are formed to correspond to the connecting unit 172a of the first color filter 170 and the connecting unit 192a of the third color filter 190, respectively. The second isolation sub-units 152b are formed to correspond to the connecting unit 172b, the connecting unit 182b, and the connecting unit 192b, respectively.

The contact unit 151 of the spacer unit 150 has a thickness T1, and contacts the first alignment layer 117 and the second alignment layer 141. The first isolation sub-units 152a each have a thickness Ta, contact the second alignment layer 141, and are spaced apart from the first alignment layer 117 by a predetermined distance Da. The second isolation sub-units 152b each have a thickness Tb, contact the second alignment layer 141, and are spaced apart from the first alignment layer 117 by a predetermined distance Db.

In some embodiments, the distance Da is less than the distance Db. In such embodiments, the first isolation sub-units 152a are disposed closer to the first alignment layer 117 than the second isolation sub-units 152b.

In some embodiments, the thickness Ta of each of the first isolation sub-units 152a may be different from the thickness Tb of each of the second isolation sub-units 152b. In other embodiments, Ta and Tb may be the same for convenience of a manufacturing process. To pattern the spacer unit 150, an exposing process may be performed once by using a half-tone mask. In embodiments where the thicknesses of the first isolation sub-units 152a and the second isolation sub-units 152b are the same, the same amount of light may penetrate half-tone mask areas for forming patterns of the first isolation sub-units 152a and the second isolation sub-units 152b.

As illustrated in the embodiment of FIG. 1, the spacer unit 150 is formed to extend across the plurality of sub-pixels. Accordingly, the space between the first substrate 106 and the second substrate 120 in which the liquid crystal layer 118 is disposed, the cell gap, can be easily maintained. The spacer unit 150 includes the contact unit 151 formed to contact the first alignment layer 117 and the second alignment layer 141 to constantly maintain the cell gap.

The spacer unit 150 includes the first isolation sub-units 152a and the second isolation sub-units 152b that are each spaced apart from the first alignment layer 117 by a predetermined distance, and thus the spacer unit 150 facilitates movement of the liquid crystal layer 118.

The liquid crystal display apparatus 100 may be pressurized while in use. Pressure may be applied in the direction of the first substrate 106 or of the second substrate 120. In those circumstances, the cell gap may be reduced so that movement of the liquid crystal layer 118 may be affected and image quality of the liquid crystal display apparatus may deteriorate.

In some embodiments, the first isolation sub-units 152a and the second isolation sub-units 152b sequentially contact the first alignment layer 117 according to the amount of pressure applied to the liquid crystal display apparatus 100. When relatively less pressure is applied, the first isolation sub-units 152a contact the first alignment layer 117, and when relatively greater pressure is applied, the second isolation sub-units 152b contact the first alignment layer 117.

Accordingly, the first isolation sub-units 152a and the second isolation sub-units 152b may easily maintain the cell gap, along with the contact unit 151.

The cell gap in which the liquid crystal layer 118 is disposed can thus be easily maintained without reduction in the mobility of the liquid crystal layer 118. Consequently, image quality of the liquid crystal display apparatus 100 can be prevented from deteriorating and thus better image quality can be secured.

The first color filter 170 of the color filter unit 160 includes the first connecting unit 172, wherein the first connecting unit 172 includes the connecting unit 172a and the connecting unit 172b having different thicknesses. The second color filter 180 and the third color filter 190 also each include connecting units having different thicknesses. Accordingly, although the first isolation sub-units 152a and the second isolation sub-units 152b are patterned to have the same thickness, the first isolation sub-units 152a and the second isolation sub-units 152b can be formed to have different distances, Da and Db, to the first alignment layer 117.

The color filter unit 160 is patterned to form the first color filter 170, the second color filter 180, and the third color filter 190 by using, for example, photolithography. Using photolithography, a material used to form any one of the first color filter 170, the second color filter 180, and the third color filter 190 is firstly formed as a thin film by using spin coating. Then, the thin film is patterned to form one color filter, for example, the first color filter 170. Next, a material used to form the second color filter 180 is formed as a thin film by using spin coating. With the first color filter 170 already formed, the material used to form the second color filter 180 may not be uniformly disposed on the entire substrate. In some embodiments, the first color filter 170 includes the connecting unit 172b and the thickness of the connecting unit 172b is relatively small so that it may function as an effective path through which the material used to form the second color filter 180 passes. Thus, the material used to form the second color filter 180 may be uniformly diffused on the substrate. The second color filter 180 is thus easily patterned. Similarly, when the third color filter 190 is formed, it is easy to precisely pattern the third color filter 190 due to the connecting unit 172b of the first color filter 170 and the connecting unit 182b of the second color filter 180.

The embodiment of FIG. 2 illustrates a TFT-LCD. However, the liquid crystal display apparatus 100 to such embodiments. A potential difference between the first electrode 116 and the second electrode 140 is formed by an external signal controlled by the gate electrodes 111, the source electrodes 113, and the drain electrodes 114. An arrangement of the liquid crystal layer 118 is determined by the potential difference, and visible rays from the backlight 105 are blocked or passed according to the arrangement of the liquid crystal layer 118. The passed light passes the color filter unit 160 and a color appears, thereby forming an image.

Figure 3:
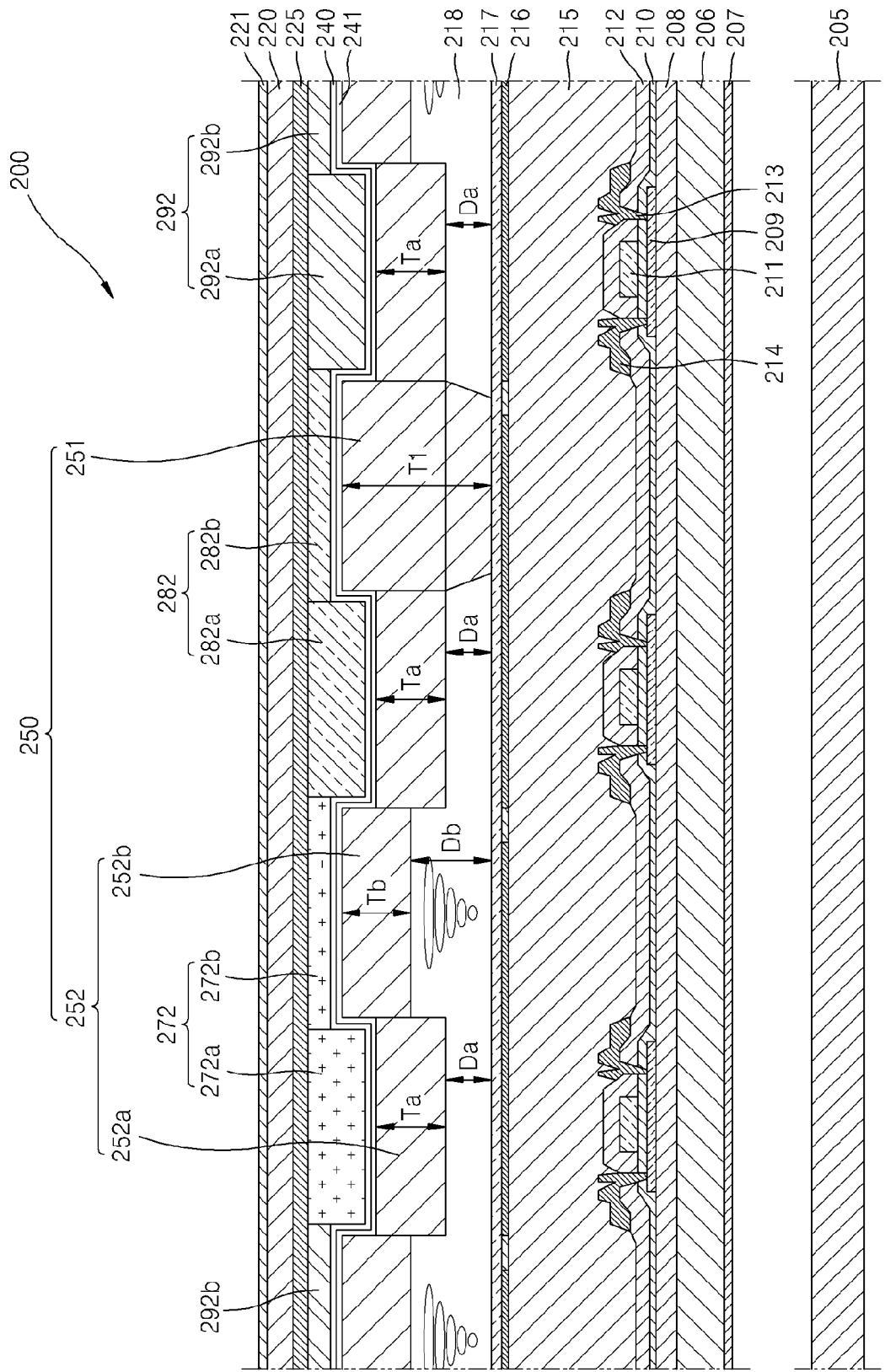
FIG. 3 is s a cross-sectional view of another embodiment of a liquid crystal display apparatus.

FIG. 3 is a cross-sectional view of another embodiment of a liquid crystal display apparatus 200. Referring to FIG. 3, the liquid crystal display apparatus 200 includes a first substrate 206, a second substrate 220, a liquid crystal layer 218, and a spacer unit 250. Descriptions of elements which are common to the different embodiments and which have already been described in relation to FIG. 2 will not be repeated. Like reference numerals generally denote like elements.

In this embodiment, the contact unit 251 of the spacer unit 250 is formed to correspond to the connecting unit 282b of the second color filter.

The first isolation sub-units 252a are formed to correspond to the connecting unit 272a of the first color filter 270, the connecting unit 282a of the second color filter 280, and the connecting unit 292a of the third color filter 290, respectively. The second isolation sub-units 252b are formed to correspond to the connecting unit 272b of the first color filter 270 and the connecting unit 292b of the third color filter 290, respectively.

In the embodiment of FIG. 3, the spacer unit 250 is formed to extend across the plurality of sub-pixels and includes the contact unit 251 so as to stably maintain a cell gap. Also, the spacer unit 250 includes the first isolation sub-units 252a and the second isolation sub-units 252b and thus facilitates movement of the liquid crystal layer 218.

Although pressure is applied to the liquid crystal display apparatus 200 while being used, the cell gap may be easily maintained while not reducing the mobility of the liquid crystal layer 218. Consequently, image quality of the liquid crystal display apparatus 200 may be prevented from deteriorating and thus excellent image quality may be secured.

In particular, the first isolation sub-units 252a are disposed to be close to the contact unit 251. The first isolation sub-units 252a are disposed to be closer to the first alignment layer 217 than the second isolation sub-units 252b. That is, a step difference between the contact unit 251 and the first isolation sub-unit 252a is smaller than a step difference between the contact unit 251 and the second isolation sub-unit 252b. The step difference between the contact unit 251 and the first isolation sub-unit 252a is a difference in height of a bottom surface of the contact unit 251 and a bottom surface of the first isolation sub-unit 252a. The step difference between the contact unit 251 and the second isolation sub-unit 252b is a difference in height of a bottom surface of the contact unit 251 and a bottom surface of the second isolation sub-unit 252b.

With the first isolation sub-units 252a close to the contact unit 251, when pressure is applied to the liquid crystal display apparatus 200, a load provided to the contact unit 251 may be more easily shared with the first isolation sub-units 252a, relative to when the first isolation sub-units 252a are far from the contact unit 251. Excessive pressure is prevented from being applied to the contact unit 251 so that the contact unit 251 and the spacer unit 250 including the contact unit 251 may be prevented from being damaged. Consequently, the ability to maintain a cell gap may be improved and durability of the spacer unit 250 may be improved.

Figure 4:
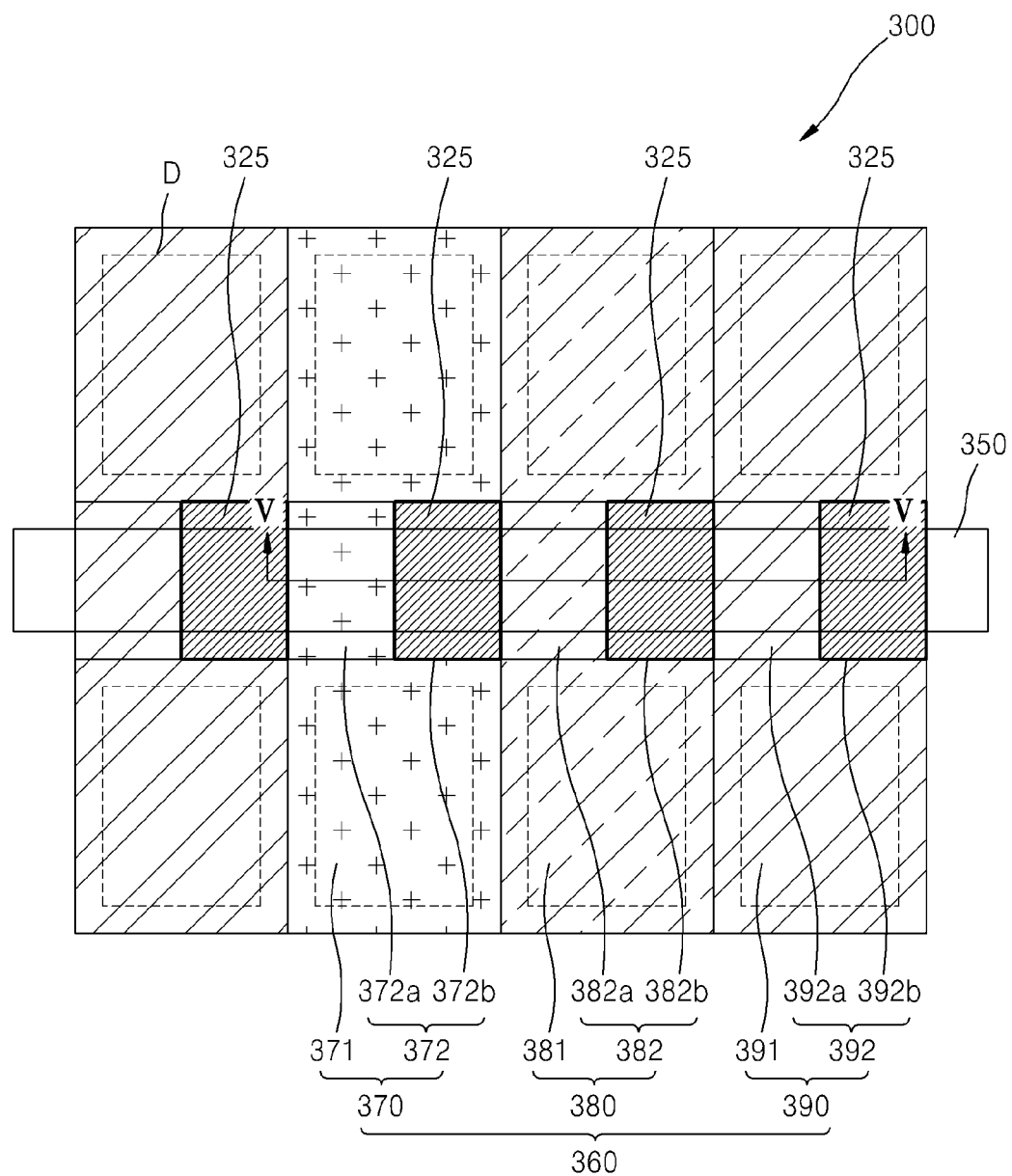
FIG. 4 is a plan view of another embodiment of a liquid crystal display apparatus.
Figure 5:
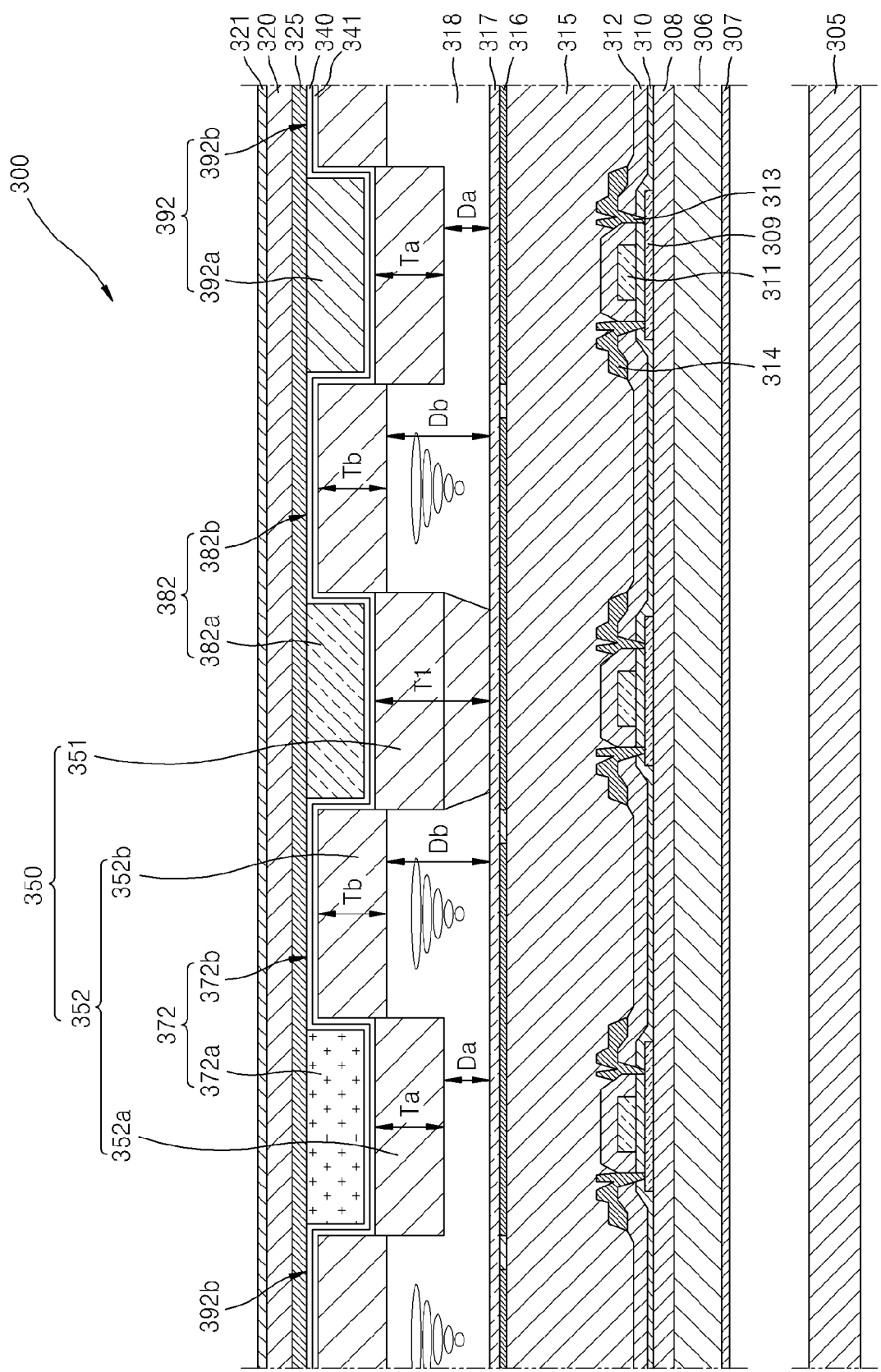
FIG. 5 is a cross-sectional view taken along line V-V of FIG. 4.

FIG. 4 is a plan view of another embodiment of a liquid crystal display apparatus 300, and FIG. 5 is a cross-sectional view taken along line V-V of FIG. 4.

Referring to FIGS. 4 and 5, the liquid crystal display apparatus 300 includes a first substrate 306, second substrate 320, a liquid crystal layer 318, and a spacer unit 350. Descriptions of elements which are common to the different embodiments and which have already been described in relation to FIGS. 1 and 2 will not be repeated. Like reference numerals generally denote like elements.

In the embodiment of FIGS. 4 and 5, the first color filter 370 includes a plurality of first area units 371 and a first connecting unit 372. The first connecting unit 372 is formed to connect two adjacent first area units 371 among the plurality of first area units 371 to each other and includes a connecting unit 372a and a penetration unit 372b. The penetration unit 372b is disposed to be close to the connecting unit 372a and to expose the black matrix layer 325.

The second color filter 380 includes a plurality of second area units 381 and a second connecting unit 382. The second connecting unit 382 is formed to connect two adjacent second area units 381 among the plurality of second area units 381 to each other and includes a connecting unit 382a and a penetration unit 382b. The penetration unit 382b is disposed to be close to the connecting unit 382a and to expose the black matrix layer 325.

The third color filter 390 includes a plurality of third area units 391 and a third connecting unit 392. The third connecting unit 392 is formed to connect two adjacent third area units 391 among the plurality of third area units 391 to each other and includes a connecting unit 392a and a penetration unit 392b. The penetration unit 392b is disposed to be close to the connecting unit 392a and to expose the black matrix layer 325.

The contact unit 351 of the spacer unit 350 is formed to correspond to the connecting unit 382a of the second color filter 380.

The isolation unit 352 of the spacer unit 350 includes a plurality of isolation sub-units. More specifically, the plurality of isolation sub-units include first isolation sub-units 352a and second isolation sub-units 352b.

The first isolation sub-units 352a are formed to correspond to the connecting unit 372a of the first color filter 370 and the connecting unit 392a of the third color filter 390, respectively. The second isolation sub-units 352b are formed to correspond to the penetration unit 372b of the first color filter 370, the penetration unit 382b of the second color filter 380, and the penetration unit 392b of the third color filter 390, respectively.

The spacer unit 350 is formed to extend across the plurality of sub-pixels and includes the contact unit 351 so as to stably maintain a cell gap. Also, the spacer unit 350 includes the first isolation sub-units 352a and the second isolation sub-units 352b and thus facilitates movement of the liquid crystal layer 318. The second isolation sub-units 352b are formed to correspond to the penetration unit 372b of the first color filter 370, the penetration unit 382b of the second color filter 380, and the penetration unit 392b of the third color filter 390, respectively, and the distance Db between the second isolation sub-units 352b and the first alignment layer 317 is sufficiently increased and thus mobility of the liquid crystal layer 318 is improved.

Even if pressure is applied to the liquid crystal display apparatus 300 during use, the cell gap may be easily maintained without reducing the mobility of the liquid crystal layer 318. Consequently, image quality of the liquid crystal display apparatus 300 may be prevented from deteriorating and thus excellent image quality may be secured.

A difference between the distance Da and the distance Db can be sufficiently increased. A part of a load provided to the contact unit 351 while pressure is applied to the liquid crystal display apparatus 300 can be sequentially shared with the first isolation sub-units 352a and the second isolation sub-units 352b by controlling the difference in time when the first isolation sub-units 352a and the second isolation sub-units 352b contact the first alignment layer 317, respectively.

Figure 6:
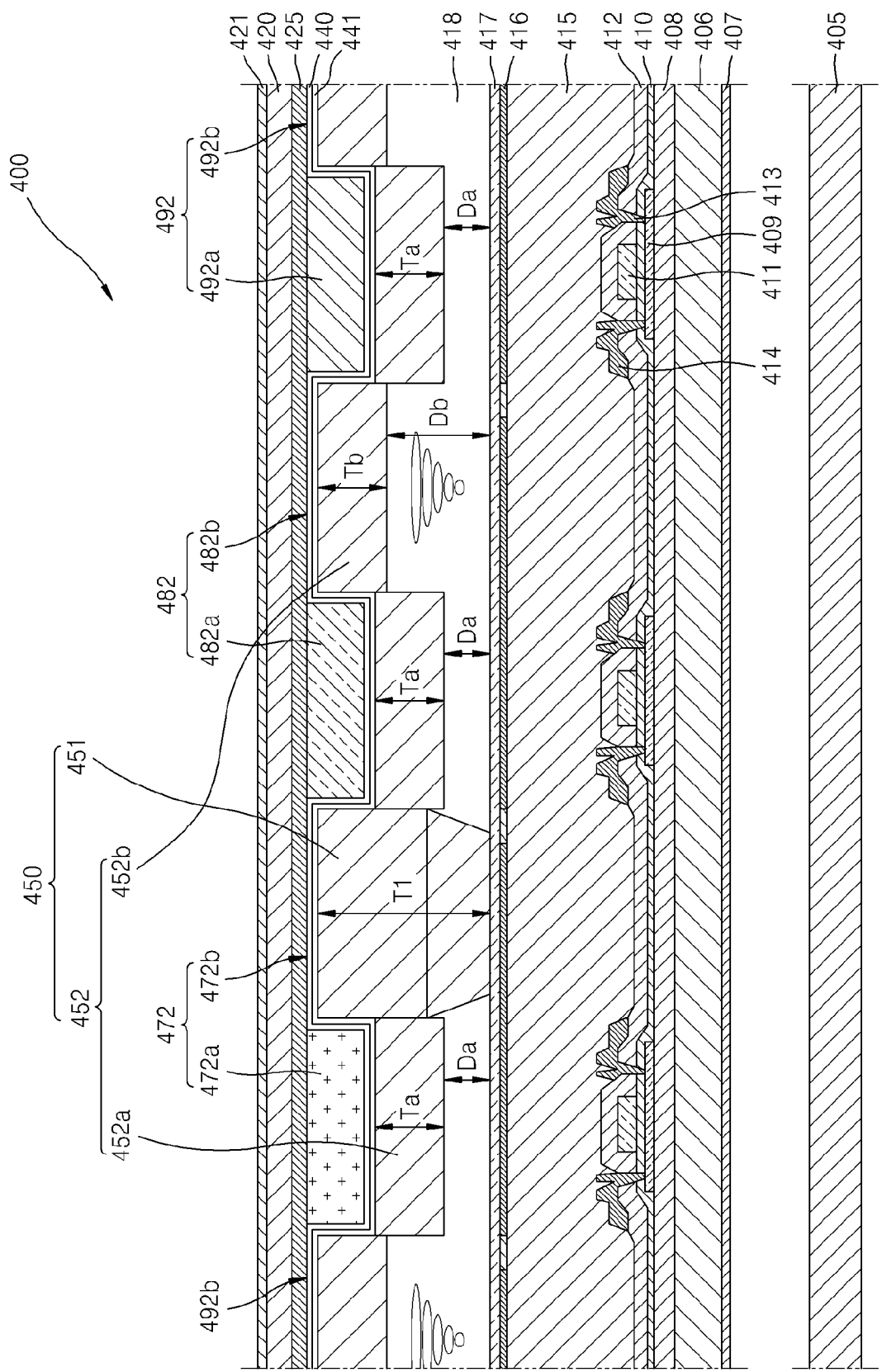
FIG. 6 is a cross-sectional view of another embodiment of a liquid crystal display apparatus.

FIG. 6 is a cross-sectional view of another embodiment of a liquid crystal display apparatus 400.

Referring to FIG. 6, the liquid crystal display apparatus 400 includes a first substrate 406, a second substrate 420, a liquid crystal layer 418, and a spacer unit 450. Descriptions of elements which are common to the different embodiments and which have already been described will not be repeated. Like reference numerals generally denote like elements.

In the embodiment of FIG. 6, the color filter unit includes a first color filter, a second color filter, and a third color filter, as illustrated in and described in relation to FIGS. 4 and 5.

In the embodiment of FIG. 6, the contact unit 451 of the spacer unit 450 is formed to correspond to the penetration unit 472b of the first color filter 470.

The isolation unit 452 of the spacer unit 450 includes a plurality of isolation sub-units. More specifically, the plurality of isolation sub-units include first isolation sub-units 452a and second isolation sub-units 452b.

The first isolation sub-units 452a are formed to correspond to the connecting unit 472a of the first color filter 470, the connecting unit 482a of the second color filter 480, and the connecting unit 492a of the third color filter 490, respectively. The second isolation sub-units 452b are formed to correspond to the penetration unit 482b of the second color filter 480 and the penetration unit 492b of the third color filter 490, respectively.

The spacer unit 450 in the embodiment of FIG. 6 is formed to extend across the plurality of sub-pixels and includes the contact unit 451 so as to stably maintain a cell gap. Also, the spacer unit 450 includes the first isolation sub-units 452a and the second isolation sub-units 452b and thus facilitates movement of the liquid crystal layer 418. In particular, the second isolation sub-units 452b are formed to correspond to the penetration unit 482b of the second color filter 480 and the penetration unit 492b of the third color filter 490, respectively, and the distance Db between the second isolation sub-units 452b and the first alignment layer 417 is increased and thus mobility of the liquid crystal layer 418 is improved.

Figure 7:
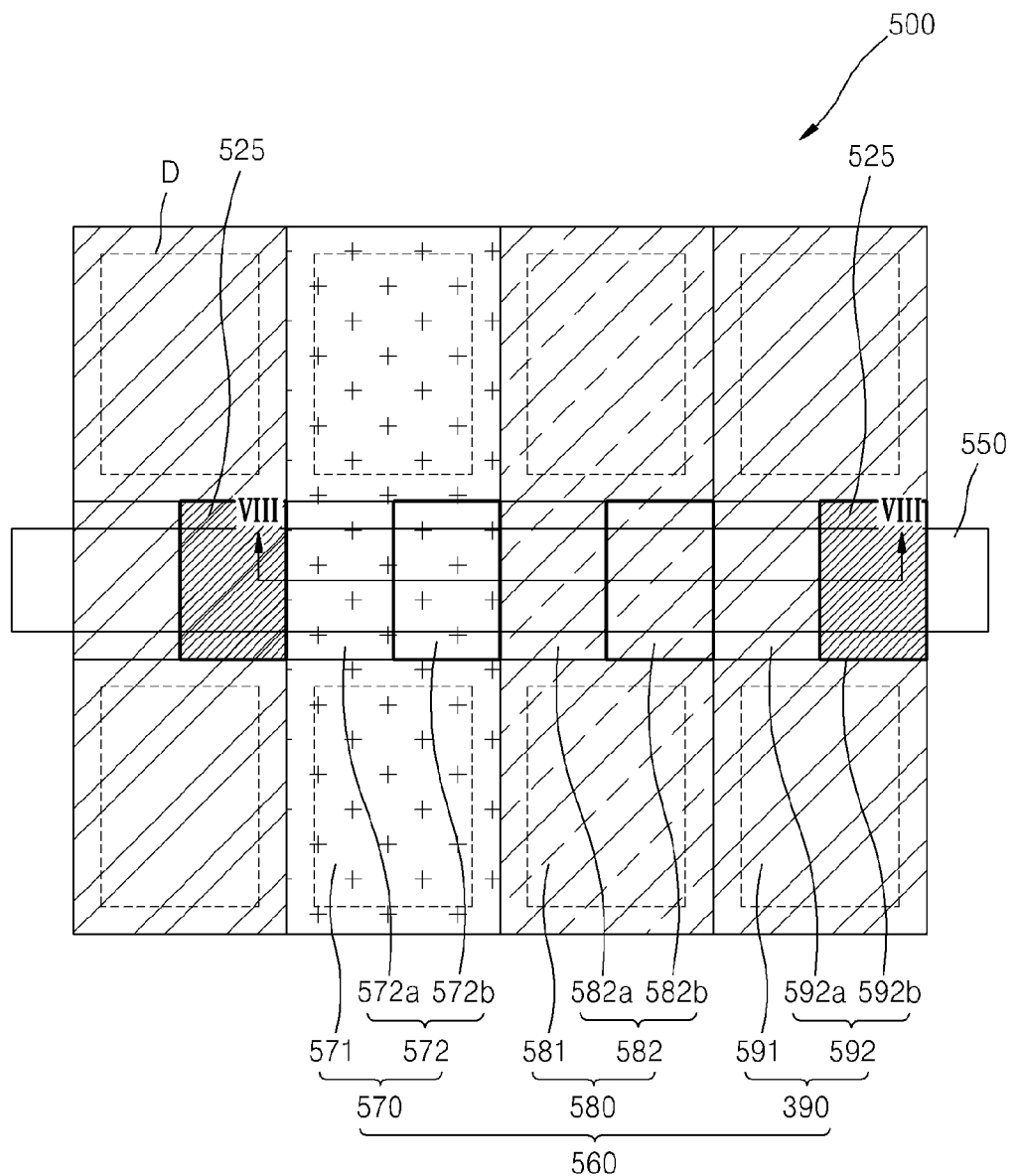
FIG. 7 is a plan view of another embodiment of a liquid crystal display apparatus.
Figure 8:
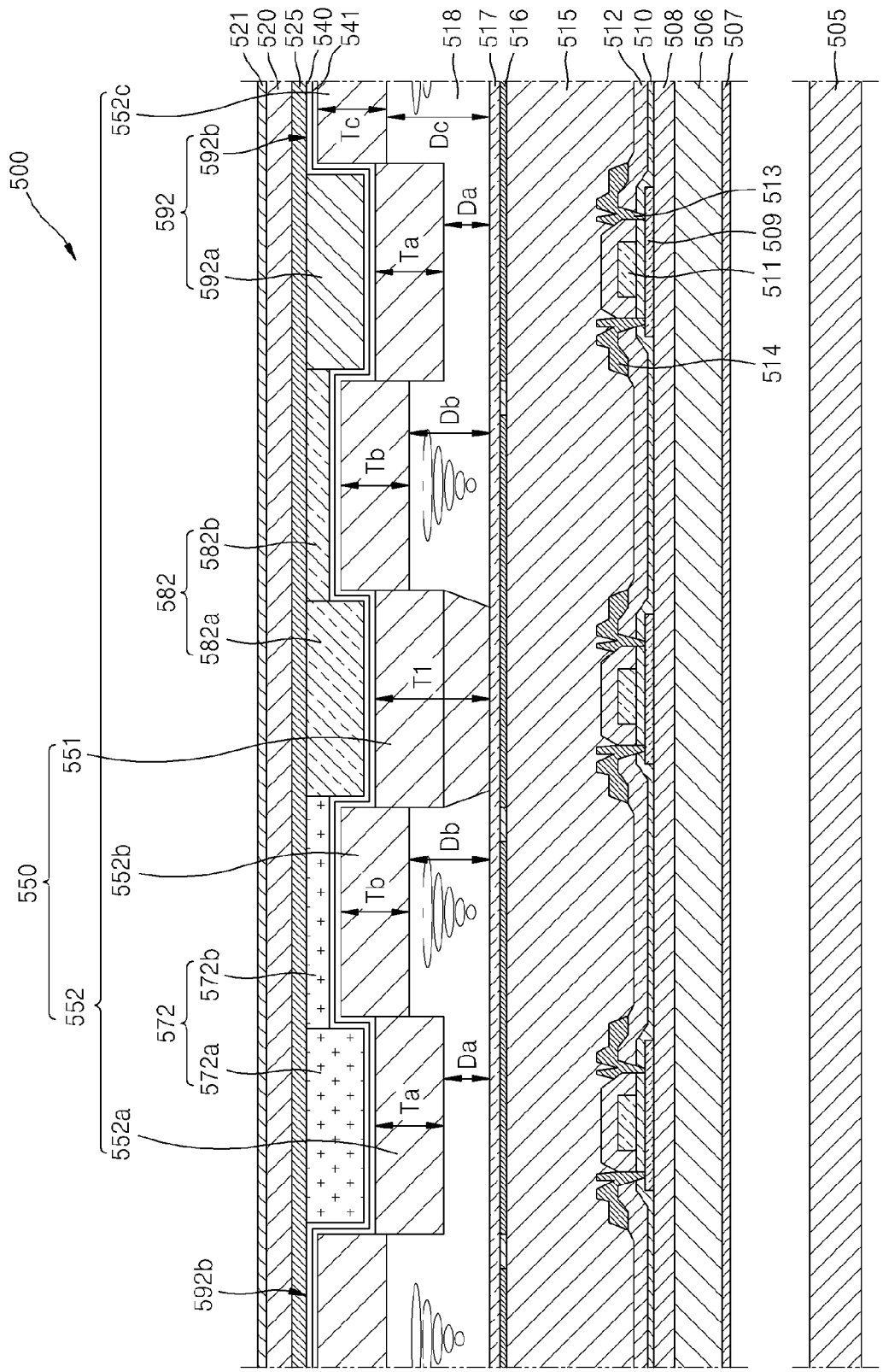
FIG. 8 is a cross-sectional view taken along line VIII-VIII of FIG. 7.

FIG. 7 is a plan view of another embodiment of a liquid crystal display apparatus 500, and FIG. 8 is a cross-sectional view of the liquid crystal display apparatus 500 of FIG. 7 taken along line VIII-VIII of FIG. 7.

Referring to FIGS. 7 and 8, the liquid crystal display apparatus 500 includes a first substrate 506, a second substrate 520, a liquid crystal layer 518 and a spacer unit 550. Descriptions of elements which are common to the different embodiments and which have already been described will not be repeated. Like reference numerals generally denote like elements.

The color filter unit 560 of the embodiment of FIG. 8 includes a first color filter 570, a second color filter 580, and a third color filter 590. The first color filter 570 includes a plurality of first area units 571, and a first connecting unit 572. The first connecting unit 572 is formed to connect two adjacent first area units 571 among the plurality of first area units 571 to each other, and includes a connecting unit 572a and a penetration unit 572b. The connecting unit 572b is disposed to be close to the connecting unit 572a and has a smaller thickness than that of the connecting unit 572a.

The second color filter 580 includes a plurality of second area units 581, and a second connecting unit 582. The second connecting unit 582 is formed to connect two adjacent second area units 581 among the plurality of second area units 581 to each other, and includes a connecting unit 582a and a connecting unit 582b. The connecting unit 582b is disposed to be close to the connecting unit 582a and has a smaller thickness than that of the connecting unit 582a.

The third color filter 590 includes a plurality of third area units 591, and a third connecting unit 592. The third connecting unit 592 is formed to connect two adjacent third area units 591 among the plurality of third area units 591 to each other, and includes a connecting unit 592a and a penetration unit 592b. The penetration unit 592b is disposed to be close to the connecting unit 592a and to expose the black matrix layer 525.

The contact unit 551 of the spacer unit 550 is formed to correspond to the connecting unit 582a of the second color filter 580.

The isolation unit 552 of the spacer unit 550 includes a plurality of isolation sub-units. More specifically, the plurality of isolation sub-units include first isolation sub-units 552a, second isolation sub-units 552b, and third isolation sub-units 552c.

The first isolation sub-units 552a are formed to correspond to the connecting unit 572a of the first color filter 570 and the connecting unit 592a of the third color filter 590, respectively. The second isolation sub-units 552b are formed to correspond to the connecting unit 572b of the first color filter and the connecting unit 582b of the second color filter 580, respectively. The third isolation sub-units 552c are formed to correspond to the penetration unit 592b of the third color filter 590.

The contact unit 551 of the spacer unit 550 has a thickness T1, and contacts the first alignment layer 517 and the second alignment layer 541. The first isolation sub-units 552a each have a thickness Ta, contact the second alignment layer 541, and are spaced apart from the first alignment layer 517 by a predetermined distance Da. The second isolation sub-units 552b each have a thickness Tb, contact the second alignment layer 541, and are spaced apart from the first alignment layer 517 by a predetermined distance Db. The third isolation sub-units 552c each have a thickness Tc, contact the second alignment layer 541, and are spaced apart from the first alignment layer 517 by a predetermined distance Dc.

The distance Da is less than the distance Db, and the distance Dc is greater than the distance Db. The first isolation sub-units 552a are disposed to be closer to the first alignment layer 517, compared with the second isolation sub-units 552b, and the second isolation sub-units 552b are disposed to be closer to the first alignment layer 517, compared with third isolation sub-units 552c.

The thickness Ta of each of the first isolation sub-units 552a, the thickness Tb of each of the second isolation sub-units 552b, and the thickness Tc of each of the third isolation sub-units 552c may be different from each other. In some embodiments, the three thicknesses may be the same for convenience of a manufacturing process.

The spacer unit 550 is formed to extend across the plurality of sub-pixels and includes the contact unit 551 so as to stably maintain a cell gap.

Also, the spacer unit 550 includes the first isolation sub-units 552a, the second isolation sub-units 552b, and the third isolation sub-units 552c and thus facilitates movement of the liquid crystal layer 518. The third isolation sub-units 552c are formed to correspond to the penetration unit 592b of the third color filter so that the distance Dc between the third isolation sub-units 552c and the first alignment layer 517 is increased and thus mobility of the liquid crystal layer 518 is improved.

Although pressure is applied to the liquid crystal display apparatus 500 while being used, the cell gap may be easily maintained while not reducing the mobility of the liquid crystal layer 518. Consequently, image quality of the liquid crystal display apparatus 500 may be prevented from deteriorating and thus excellent image quality may be secured.

In particular, when pressure is applied to the liquid crystal display apparatus 500, a part of a load provided to the contact unit 551 may be sequentially shared with the first isolation sub-units 552a, the second isolation sub-units 552b, and the third isolation sub-units 552c and thus a cell gap may be efficiently maintained according to a pressure condition.

Figure 9:
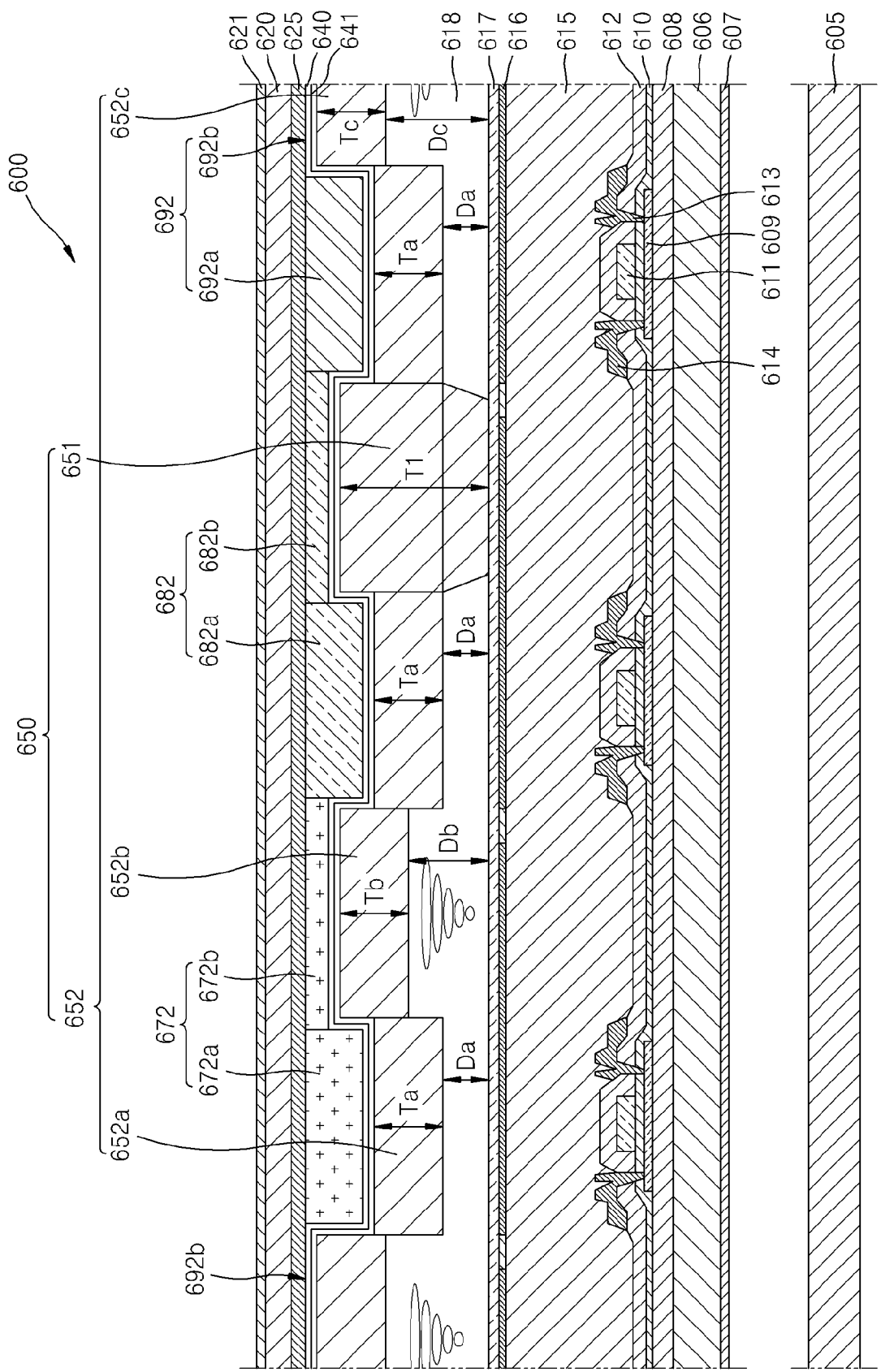
FIG. 9 is a cross-sectional view of another embodiment of a liquid crystal display apparatus.

FIG. 9 is a cross-sectional view of another embodiment of a liquid crystal display apparatus 600.

Referring to FIG. 9, the liquid crystal display apparatus 600 includes a first substrate 606, a second substrate 620, a liquid crystal layer 618, and a spacer unit 650. Descriptions of elements which are common to the different embodiments and which have already been described will not be repeated. Like reference numerals generally denote like elements.

The color filter unit according to the embodiment of FIG. 9 includes a first color filter, a second color filter, and a third color filter. The first color filter includes first area units (not illustrated) and a first connecting unit 672. The first connecting unit 672 is formed to connect two adjacent first area units (not illustrated) to each other and includes a connecting unit 672a and a connecting unit 672b. The connecting unit 672b is disposed to be close to the connecting unit 672a and is formed to have a smaller thickness than that of the connecting unit 672a.

The second color filter includes second area units (not illustrated) and a second connecting unit 682. The second connecting unit 682 is formed to connect two adjacent second area units (not illustrated) to each other and includes a connecting unit 682a and a connecting unit 682b. The connecting unit 682b is disposed to be close to the connecting unit 682a and is formed to have a smaller thickness than that of the connecting unit 682a.

The third color filter includes third area units (not illustrated) and a third connecting unit 692. The third connecting unit 692 is formed to connect two adjacent third area units (not illustrated) to each other and includes a connecting unit 692a and a penetration unit 692b. The penetration unit 692b is disposed to be close to the connecting unit 692a and to expose the black matrix layer 625.

The contact unit 651 of the spacer unit 650 is formed to correspond to the connecting unit 682b.

The isolation unit 652 of the spacer unit 650 includes a plurality of isolation sub-units. More specifically, the plurality of isolation sub-units include first isolation sub-units 652a, second isolation sub-units 652b, and third isolation sub-units 652c.

The first isolation sub-units 652a are formed to correspond to the connecting unit 672a, the connecting unit 682a, and the connecting unit 692a, respectively. The second isolation sub-units 652b are formed to correspond to the connecting unit 672b. The third isolation sub-units 652c are formed to correspond to the penetration unit 692b.

The contact unit 651 of the spacer unit 650 has a thickness T1, and contacts the first alignment layer 617 and the second alignment layer 641. The first isolation sub-units 652a each have a thickness Ta, contact the second alignment layer 641, and are spaced apart from the first alignment layer 617 by a predetermined distance Da. The second isolation sub-units 652b each have a thickness Tb, contact the second alignment layer 641, and are spaced apart from the first alignment layer 617 by a predetermined distance Db. The third isolation sub-units 652c have a thickness Tc, contact the second alignment layer 641, and are spaced apart from the first alignment layer 617 by a predetermined distance Dc.

The distance Da is less than the distance Db, and the distance Dc is greater than the distance Db. That is, the first isolation sub-units 652a are disposed to be closer to the first alignment layer 617, compared with the second isolation sub-units 652b, and the second isolation sub-units 652b are disposed to be closer to the first alignment layer 617, compared with third isolation sub-units 652c.

The thickness Ta of each of the first isolation sub-units 652a, the thickness Tb of each of the second isolation sub-units 652b, and the thickness Tc of each of the third isolation sub-units 652c may be different from each other; however, in some embodiments, may be the same for convenience of a manufacturing process.

The spacer unit 650 is formed to extend across the plurality of sub-pixels and includes the contact unit 651 so as to stably maintain a cell gap. Also, the spacer unit 650 includes the first isolation sub-units 652a, the second isolation sub-units 652b, and the third isolation sub-units 652c and thus facilitates movement of the liquid crystal layer 618. The third isolation sub-units 652c are formed to correspond to the penetration unit 692b so that the distance Dc between the third isolation sub-units 652c and the first alignment layer 617 is increased and thus mobility of the liquid crystal layer 618 is improved.

Although pressure is applied to the liquid crystal display apparatus 600 while being used, the cell gap may be easily maintained while not reducing the mobility of the liquid crystal layer 618. Consequently, image quality of the liquid crystal display apparatus 600 may be prevented from deteriorating and thus excellent image quality may be secured.

When pressure is applied to the liquid crystal display apparatus 600, a part of a load provided to the contact unit 651 may be sequentially shared with the first isolation sub-units 652a, the second isolation sub-units 652b, and the third isolation sub-units 652c and thus a cell gap may be efficiently maintained according to a pressure condition.

In addition, the first isolation sub-units 652a are disposed to be close to the contact unit 651. The first isolation sub-units 652a are disposed to be closer to the first alignment layer 617, compared with the second isolation sub-units 652b and the third isolation sub-units 652c. That is, a step difference between the contact unit 651 and the first isolation sub-unit 652a is smaller than a step difference between the contact unit 651 and the second isolation sub-unit 652b and a step difference between the contact unit 651 and the third isolation sub-units 652c. As the first isolation sub-units 652a having the smallest step difference with the contact unit 651 are disposed to be close to the contact unit 651, a load provided to the contact unit 651 may be easily shared with the first isolation sub-units 652a that are close to the contact unit 651 when pressure is applied to the liquid crystal display apparatus 600. Thus, the ability to maintain a cell gap may be improved and durability of the spacer unit 650 may be improved.

Figure 10:
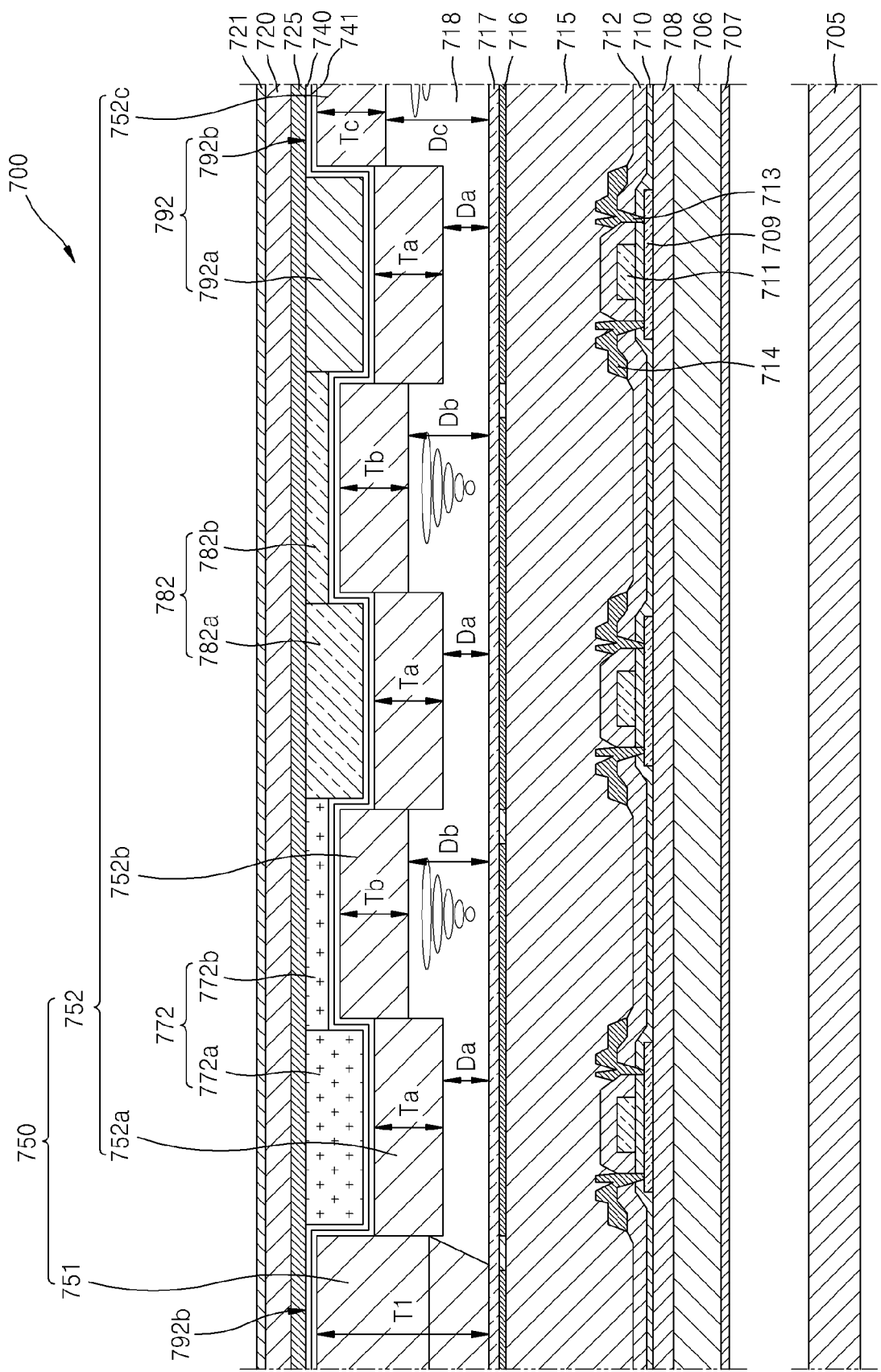
FIG. 10 is a cross-sectional view of another embodiment of a liquid crystal display apparatus.

FIG. 10 is a cross-sectional view of another embodiment of a liquid crystal display apparatus 700.

Referring to FIG. 10, the liquid crystal display apparatus 700 includes a first substrate 706, a second substrate 720, a liquid crystal layer 718, and a spacer unit 750. Descriptions of elements which are common to the different embodiments and which have already been described will not be repeated. Like reference numerals generally denote like elements.

The color filter unit according to the embodiment of FIG. 10 includes a first color filter, a second color filter, and a third color filter. The first color filter includes first area units (not illustrated) and a connecting unit 772. The first connecting unit 772 is formed to connect two adjacent first area units (not illustrated) to each other and includes a connecting unit 772a and a connection unit 772b. The connecting unit 772b is disposed to be close to the connecting unit 772a and has a smaller thickness than that of the connecting unit 772a.

The second color filter includes second area units (not illustrated) and a second connecting unit 782. The second connecting unit 782 is formed to connect two adjacent second area units (not illustrated) to each other and includes a connecting unit 782a and a connecting unit 782b. The connecting unit 782b is disposed to be close to the connecting unit 782a and has a smaller thickness than that of the connecting unit 782a.

The third color filter includes third area units (not illustrated) and a third connecting unit 792. The third connecting unit 792 is formed to connect two adjacent third area units (not illustrated) to each other and includes connecting units 792a and penetration units 792b. The penetration units 792b are disposed to be close to the connecting units 792a and to expose the black matrix layer 725.

The contact unit 751 of the spacer unit 750 is formed to correspond to at least one of the penetration units 792b.

The isolation unit 752 of the spacer unit 750 includes a plurality of isolation sub-units. More specifically, the plurality of isolation sub-units include first isolation sub-units 752a, second isolation sub-units 752b, and a third isolation sub-unit 752c.

The first isolation sub-units 752a are formed to correspond to the connecting unit 772a, the connecting unit 782a, and the connecting unit 792a, respectively. The second isolation sub-units 752b are formed to correspond to the connecting unit 772b and the connecting unit 782b. The third isolation sub-unit 752c is formed to correspond to at least one of the penetration units 792b on which the contact unit 751 is not formed from among the third penetration units 792b.

The contact unit 751 of the spacer unit 750 has a thickness T1, and contacts the first alignment layer 717 and the second alignment layer 741. The first isolation sub-units 752a each have a thickness Ta, contact the second alignment layer 741, and are spaced apart from the first alignment layer 717 by a predetermined distance Da. The second isolation sub-units 752b each have a thickness Tb, contact the second alignment layer 741, and are spaced apart from the first alignment layer 717 by a predetermined distance Db. The third isolation sub-units 752c each have a thickness Tc, contact the second alignment layer 741, and are spaced apart from the first alignment layer 717 by a predetermined distance Dc.

The distance Da is less than the distance Db, and the distance Dc is greater than the distance Db. The first isolation sub-units 752a are disposed to be to the first alignment layer 717 compared with the second isolation sub-units 752b and the second isolation sub-units 752b are disposed to be to the first alignment layer 717 compared with third isolation sub-units 752c.

The thickness Ta of the first isolation sub-units 752a, the thickness Tb of the second isolation sub-units 752b, and the thickness Tc of the third isolation sub-units 752c may be different from each other; however, in some embodiments, the thicknesses may be the same for convenience of a manufacturing process.

The spacer unit 750 according to the embodiment of FIG. 10 is formed to extend across the plurality of sub-pixels and includes the contact unit 751 so as to stably maintain a cell gap. Also, the spacer unit 750 includes the first isolation sub-units 752a, the second isolation sub-units 752b, and the third isolation sub-units 752c and thus facilitates movement of the liquid crystal layer 718. In particular, the third isolation sub-units 752c are formed to correspond to the penetration unit 792b so that the distance Dc between the third isolation sub-units 752c and the first alignment layer 717 is increased and thus mobility of the liquid crystal layer 718 is improved.

Although pressure is applied to the liquid crystal display apparatus 700 during use, the cell gap may be easily maintained without reducing the mobility of the liquid crystal layer 718. Consequently, image quality of the liquid crystal display apparatus 700 may be prevented from deteriorating and thus excellent image quality may be secured.

When pressure is applied to the liquid crystal display apparatus 700, a part of a load provided to the contact unit 751 may be sequentially shared with the first isolation sub-units 752a, the second isolation sub-units 752b, and the third isolation sub-units 752c and thus a cell gap may be efficiently maintained according to a pressure condition.

In addition, the first isolation sub-units 752a are disposed to be close to the contact unit 751. As the first isolation sub-units 752a having the smallest step difference with the contact unit 751 are disposed to be close to the contact unit 751, a load provided to the contact unit 751 may be easily shared with the first isolation sub-units 752a that are close to the contact unit 751 when pressure is applied to the liquid crystal display apparatus 700. Thus, the ability to maintain a cell gap may be improved and durability of the spacer unit 750 may be improved.

Figure 11:
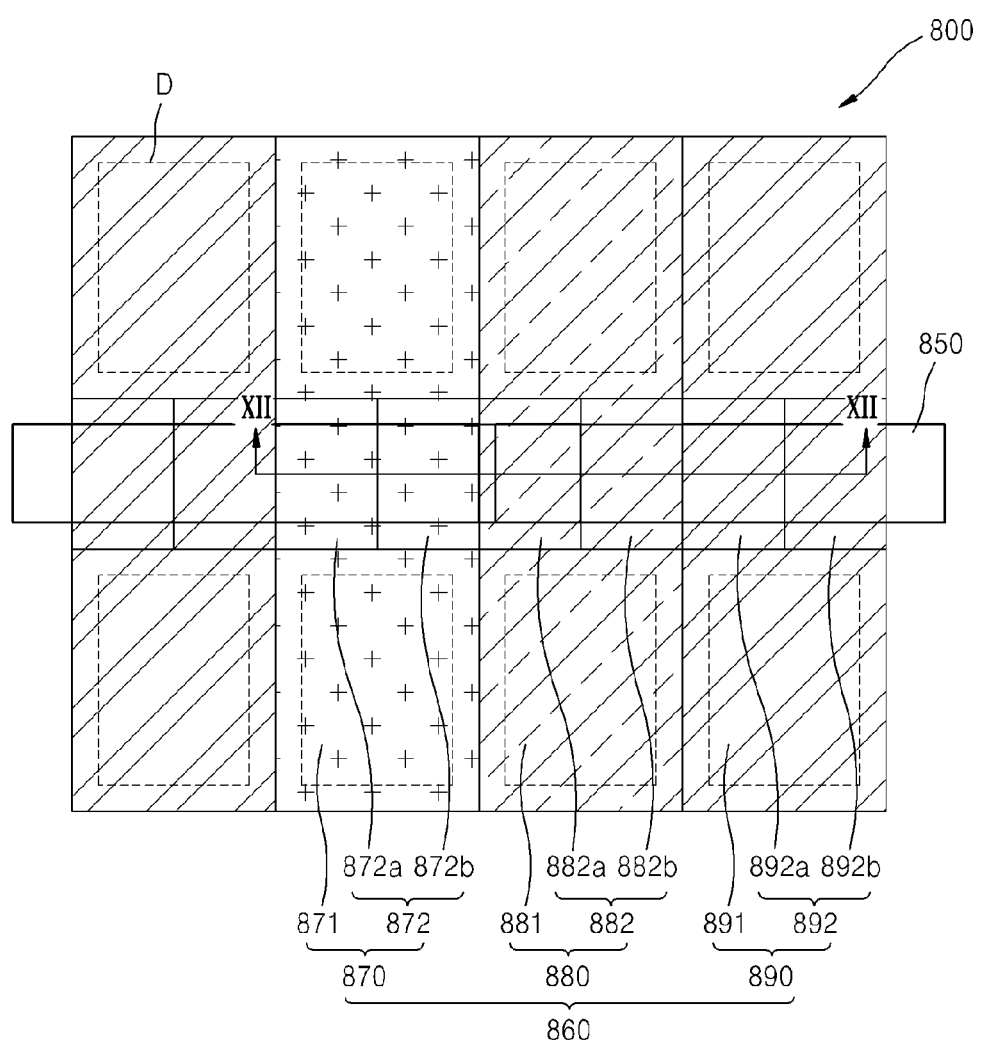
FIG. 11 is a plan view of another embodiment of a liquid crystal display apparatus.
Figure 12:
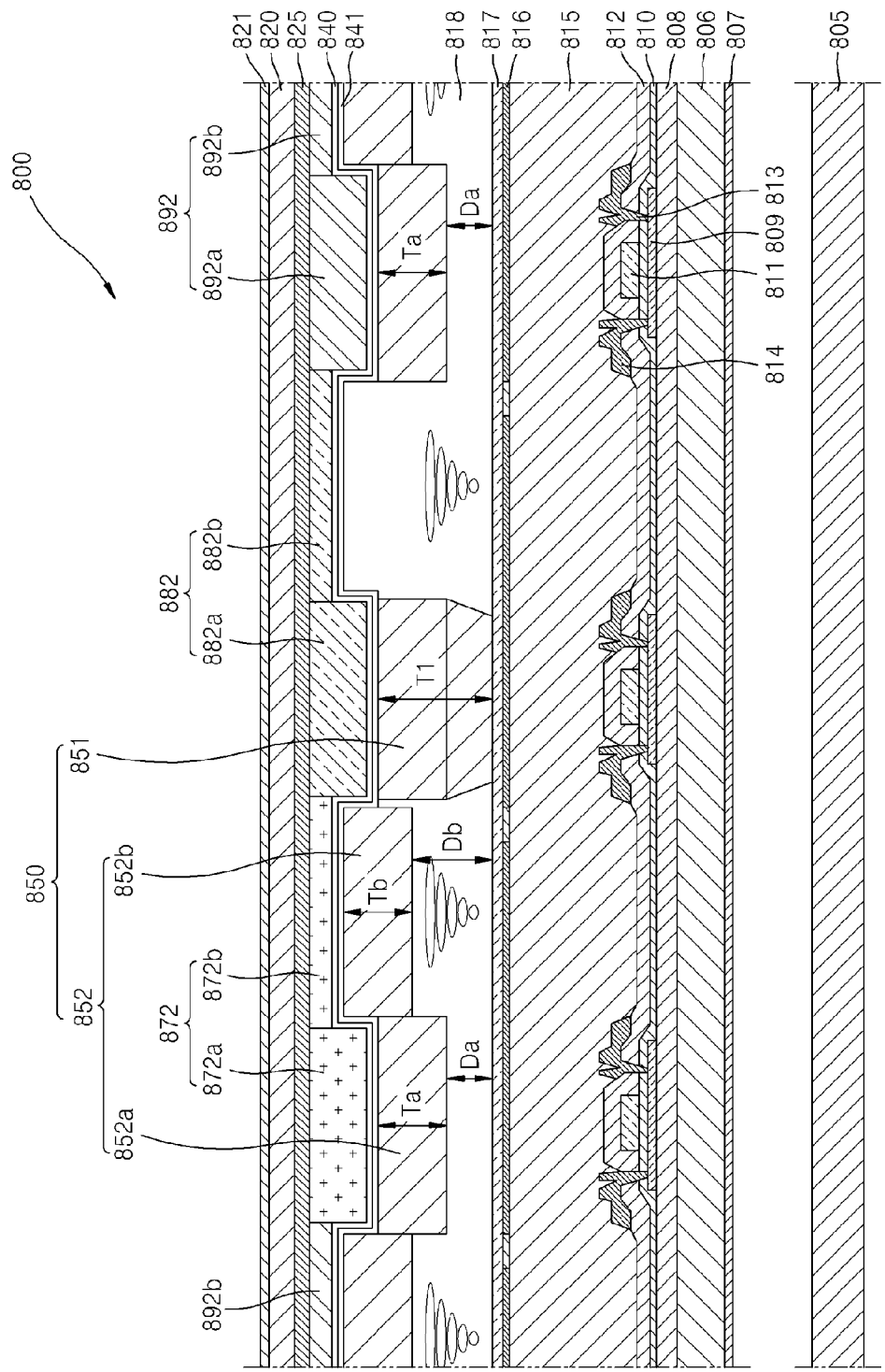
FIG. 12 is a cross-sectional view taken along line XII-XII of FIG. 11.

FIG. 11 is a plan view of another embodiment of a liquid crystal display apparatus 800, and FIG. 12 is a cross-sectional view taken along line XII-XII of FIG. 11. Descriptions of elements which are common to the different embodiments and which have already been described will not be repeated. Like reference numerals generally denote like elements.

Referring to FIGS. 11 and 12, the liquid crystal display apparatus 800 includes a first substrate 806, a second substrate 820, a liquid crystal layer 818, and a spacer unit 850.

The contact unit 851 and the isolation unit 852 of the spacer unit 850 are disposed spaced apart from each other. In FIG. 11, the spacer unit 850 is represented in a bold solid line and a separate square part is illustrated at the center area of the spacer unit 850. The separate square part corresponds to the contact unit 851 of FIG. 12. That is, in FIG. 12, the contact unit 851 is spaced apart from a second isolation sub-unit 852b formed to correspond to a connecting unit 872b, and the contact unit 851 is spaced apart from a first isolation sub-unit 852a formed to correspond to a connecting unit 892a.

The color filter 860 includes a first color filter 870, a second color filter 880, and a third color filter 890. The black matrix layer 825 is formed between the second substrate 820 and the color filter unit 860 in order to prevent colors from being mixed and to improve contrast. Here, visible rays are not realized in a part covered by the black matrix layer 825.

The first color filter 870 includes first area units 871 and a first connecting unit 872. The first connecting unit 872 is formed to connect two adjacent first area units 871 to each other and includes a connecting unit 872a and a connecting unit 872b. The connecting unit 872b has a smaller thickness than that of the connecting unit 872a.

The second color filter 880 includes second area units 881 and a second connecting unit 882. The second connecting unit 882 is formed to connect two adjacent second area units 881 to each other and includes a connecting unit 882a and a connecting unit 882b. The connecting unit 882b has a smaller thickness than that of the connecting unit 882a.

The third color filter 890 includes third area units 891 and a third connecting unit 892. The third connecting unit 892 is formed to connect two adjacent third area units 891 to each other and includes the connecting unit 892a and a connecting unit 892b. The connecting unit 892b has a smaller thickness than that of the connecting unit 892a.

The contact unit 851 of the spacer unit 850 is formed to correspond to the connecting unit 882a of the second color filter 880.

The isolation unit 852 of the spacer unit 850 includes a plurality of isolation sub-units including first isolation sub-units 852a and the second isolation sub-units 852b.

The first isolation sub-units 852a are formed to correspond to the connecting unit 872a of the first color filter 870 and the connecting unit 892a of the third color filter 890, respectively. The second isolation sub-units 852b are formed to correspond to the connecting unit 872b and the connecting unit 892b, respectively. The spacer unit 850 may not exist in the connecting unit 882b of the second color filter 880. Accordingly, mobility of the liquid crystal layer 818 may be improved.

The contact unit 851 of the spacer unit 850 has a thickness T1, and contacts the first alignment layer 817 and the second alignment layer 841. The first isolation sub-units 852a each have a thickness Ta, contact the second alignment layer 841, and are spaced apart from the first alignment layer 817 by a predetermined distance Da. The second isolation sub-units 852b each have a thickness Tb, contact the second alignment layer 841, and are spaced apart from the first alignment layer 817 by a predetermined distance Db.

The distance Da is less than the distance Db. That is, the first isolation sub-units 852a are disposed closer to the first alignment layer 817 than the second isolation sub-units 852b.

The thickness Ta of each of the first isolation sub-units 852a may be different from the thickness Tb of each of the second isolation sub-units 852b; however, may be the same for convenience of a manufacturing process.

The spacer unit 850 is formed to have an extended part and a part spaced apart from the extended part, as illustrated in FIG. 11. Accordingly, a space between the first substrate 806 and the second substrate 820 in which the liquid crystal layer 818 is disposed, that is, a cell gap, may be easily maintained. In particular, the spacer unit 850 includes the contact unit 851 that is formed to contact the first alignment layer 817 and the second alignment layer 841 to stably maintain a cell gap.

Also, the spacer unit 850 includes the first isolation sub-units 852a and the second isolation sub-units 852b that are each spaced apart from the first alignment layer 817 by a predetermined distance and thus facilitates movement of the liquid crystal layer 818.

If pressure is applied to the liquid crystal display apparatus 800 while in use, the first isolation sub-units 852a and the second isolation sub-units 852b may sequentially contact the first alignment layer 817 according to the pressure. If pressure is applied, the first isolation sub-units 852a and the second isolation sub-units 852b may maintain a cell gap, along with the contact unit 851.

Accordingly, although pressure is applied to the liquid crystal display apparatus 800 while being used, the cell gap may be easily maintained while not reducing the mobility of the liquid crystal layer 818. Consequently, image quality of the liquid crystal display apparatus 800 may be prevented from deteriorating and thus excellent image quality may be secured The liquid crystal display apparatus according to embodiments described herein may have improved image quality.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A liquid crystal display apparatus, comprising:
   a plurality of sub-pixels;
   a first substrate on which at least one first thin film is disposed;
   a second substrate facing the first substrate and on which at least one second thin film is disposed;
   a liquid crystal layer disposed between the first substrate and the second substrate; and
   a spacer unit disposed between the first substrate and the second substrate to maintain a space where the liquid crystal layer is disposed, and continuously formed across at least two sub-pixels from among the plurality of sub-pixels,
   wherein the spacer unit comprises a contact unit and an isolation unit comprising a plurality of isolation sub-units, wherein the contact unit is formed to contact the first thin film closest to the liquid crystal layer and the second thin film closest to the liquid crystal layer, wherein the isolation unit is formed to be spaced apart from the first thin film closest to the liquid crystal layer and to contact the second thin film closest to the liquid crystal layer, and wherein a distance between the plurality of isolation sub-units and the first thin film closest to the liquid crystal layer is not uniform, wherein there are a plurality of second thin films, which together comprise a color filter unit comprising a first color filter, a second color filter, and a third color filter, wherein the first color filter comprises a plurality of first area units and a first connecting unit connecting the first area units that are adjacent to each other, wherein the second color filter comprises a plurality of second area units and a second connecting unit connecting the second area units that are adjacent to each other, wherein the third color filter comprises a plurality of third area units and a third connecting unit connecting the third area units that are adjacent to each other, wherein each of the first, second and third connecting units comprises two connecting sub-units with different thicknesses from one another, and wherein the contact unit of the spacer unit is formed to correspond to the thicker of the connecting sub-units of each of the three color filters, and wherein the isolation sub-units of the spacer unit comprise first isolation sub-units and second isolation sub-units, the first isolation sub-unit is formed to correspond to the thicker of the connecting sub-units of the three color filters, in each of which the contact unit is not formed, and the second isolation sub-unit is formed to correspond to the thinner of the connection sub-units of the three color filters.

2. The apparatus of claim 1, wherein a distance between the first isolation sub-unit and the first thin film closest to the liquid crystal layer is less than a distance between the second isolation sub-unit and the second thin film closest to the liquid crystal layer.

3. The apparatus of claim 1, wherein the first isolation sub-unit and the second isolation sub-unit have the same thickness.

* * * * *

UNITED STATES PATENT AND TRADEMARK OFFICE
CERTIFICATE OF CORRECTION

PATENT NO. : 8,908,139 B2  
APPLICATION NO. : 13/077436  
DATED : December 9, 2014  
INVENTOR(S) : Dong-Yoon So et al.

Page 1 of 1

It is certified that error appears in the above-identified patent and that said Letters Patent is hereby corrected as shown below:

Title page, item 57, line 13, please delete "plurality", and insert -- plurality of --, therefor.

Specification

At column 1, line 47, please delete "plurality", and insert -- plurality of --, therefor.

At column 14, line 41, please delete "secured", and insert -- secured. --, therefor.

Signed and Sealed this
Twentieth Day of October, 2015

Michelle K. Lee
*Director of the United States Patent and Trademark Office*